UNITED STATES PATENT OFFICE.

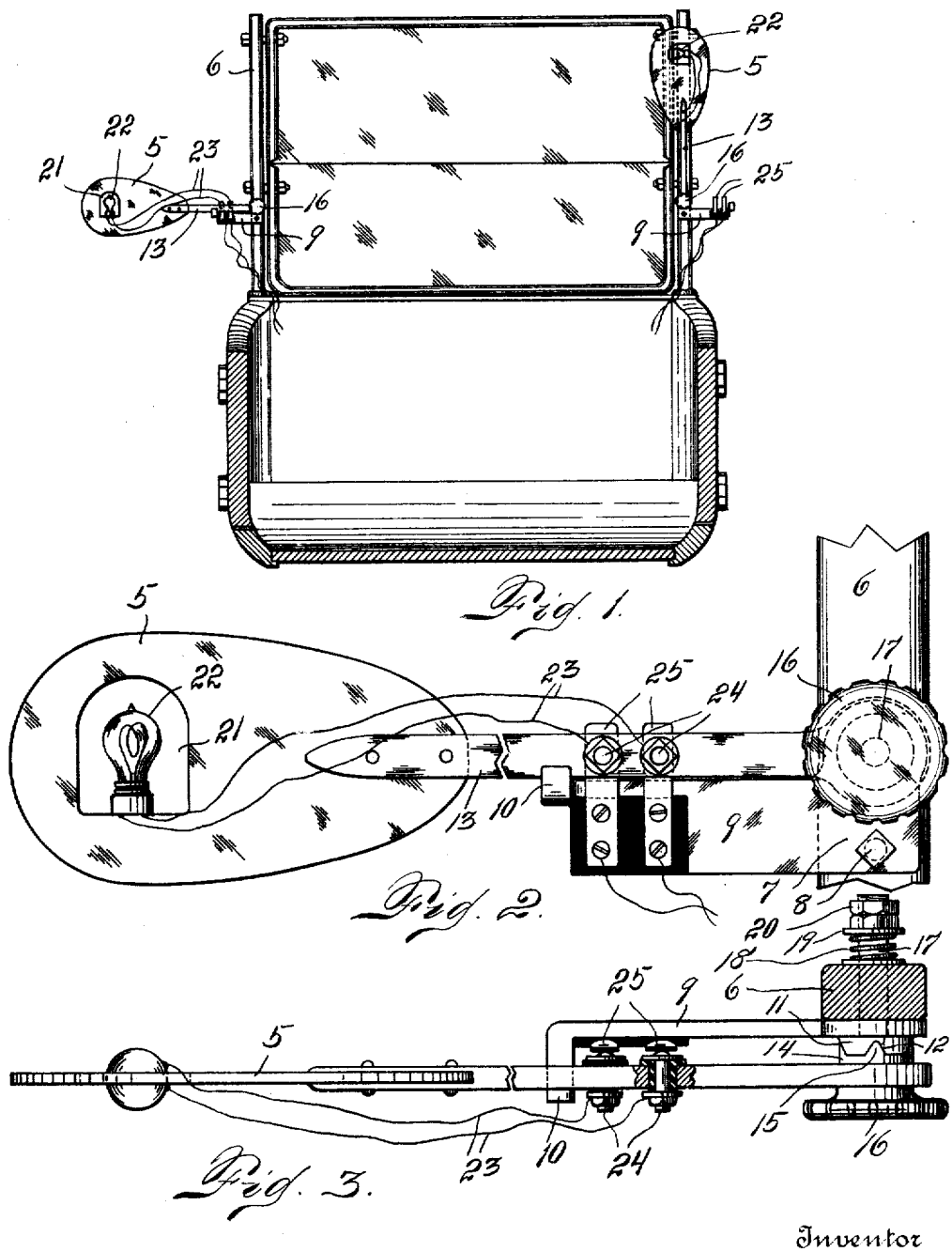

JACKSON C. HOYT, OF DENVER, COLORADO.

AUTOMOBILE-SIGNAL.

1,308,284.     Specification of Letters Patent.     Patented July 1, 1919.

Application filed September 29, 1916. Serial No. 122,810.

*To all whom it may concern:*

Be it known that I, JACKSON C. HOYT, citizen of the United States, residing at the city and county of Denver and State of Colorado, have invented certain new and useful Improvements in Automobile-Signals; and I do declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates to automobile signals and pertains more particularly to that type used to indicate the direction which a machine is about to turn.

The principal object of the invention consists in providing a pair of movable signaling devices of the class described either of which can be quickly and easily operated to display an indicator which may be readily seen by the drivers of approaching or following cars.

A further object of the invention consists in producing an extremely simple arrangement adapted to be hand-operated, and one which precludes the necessity of the driver holding one hand out at the side of the machine.

A still further object consists in equipping each of the movable signal members with a lamp which, at night, will be automatically illuminated when the devices are lowered into operative position, and will be similarly extinguished when the devices are raised into normal position.

With these and other objects in view the invention consists in the combination and arrangement of parts more fully set forth in the following specification, illustrated in the accompanying drawings and more particularly pointed out in the appended claims.

In the drawing:—

Figure 1 is a transverse sectional detail through the forward part of an automobile showing the wind shield in elevation and with one embodiment of the present invention applied thereto.

Fig. 2 is a rear elevation of one of the movable signals shown in lowered position, and Fig. 3 is a top plan view of the same.

Referring now to the drawings, it will be seen that a pair of movable signals or semaphores 5 are provided, one carried at each side of the wind shield. As these devices are identical in construction and operation, a detailed description of one will suffice for both. To the upright 6 of the wind shield a bracket plate 7 is bolted as at 8 or otherwise fixedly secured thereto. The bracket 7 comprises an arm member 9 extending outwardly from the upright 6 at right angles and having a right angle finger 10 provided at its outer free extremity. A circular boss 11 is formed near the inner end of the arm 9 and is provided with a series of gradually inclined cams or notches 12. The arm 9 is perforated centrally of the boss 11. The signal or semaphore 5 is provided with a rigid extension supporting arm 13 provided at its inner end with a boss 14 integral therewith and having inclined cams or teeth 15 corresponding in size and shape with those formed on the boss 11 of arm 9. On its opposite face the arm 13 is provided with a circular knob or handle 16 by means of which it is adapted to be operated. A post or stem 17 extends centrally from boss 14 and passes through the perforation of boss 11 and a corresponding circular opening in the upright 6. A coiled spring 18 surrounds the projecting end of stem 17 and is suitably retained between a pair of washers 19 one of which bears against the outer surface of upright 6 and the other against the inner face of an adjusting nut 20 threaded on the outer extremity of stem 17. Thus the parts are normally held in close contacting relation while the arm 13 may be pulled slightly outward away from the supporting bracket 7 by the cam action of the engaging teeth and notches 15 and 12 respectively.

The semaphore 5 is provided with an opening or recess 21 in which is carried a small incandescent electric lamp 22 having conducting wires 23 connecting its terminals with a pair of insulated contact pins 24 suitably carried in transverse openings in the arm 13. A pair of upright spring contact members 25 are suitably supported on the arm 9 being insulated therefrom and receiving current from any desirable source as a storage battery (not shown).

From the foregoing description the operation of the signals will be apparent. When for example, it is desired to make a turn to the left the driver grasps the knob 16 and turns it to the left, lowering the arm or semaphore 5 into operative position as shown in the figures of the drawing. The semaphore then rests on the rigid arm 9 and is prevented from lateral movement by the finger 10 and spring contact fingers 25. At night when the battery is connected a circuit will be automatically closed when the pins 24 contact with the spring fingers 25 and the lamp 22 will be illuminated simultaneously with the closing of the circuit. The engagement of the cams 12 and 15 will tend to hold the parts against accidental displacement. After turning the corner the knob 16 is moved to the right and the semaphore 5 raised to the vertical inoperative position shown at the right of Fig. 1. The lamp will be automatically extinguished as soon as the contact between fingers 25 and pin 24 has been broken.

Having described my invention what I claim is:

1. A vehicle signal comprising a movable semaphore pivotally connected with the vehicle, a supporting arm secured to the vehicle and extending laterally therefrom in a plane parallel to that in which the semaphore moves, a rest on the outer end of said arm to support the free end of the semaphore when in signaling position, said rest comprising a lateral offset on the end of said arm having an upwardly projecting lip, and lips on said arm adjacent its free end, said last named lips constituting electric contacts, contacts on the semaphore to engage therewith when in signaling position, all of said lips constituting means to prevent lateral movement of the semaphore on said arm.

2. A vehicle signal comprising a movable semaphore, a post journaled on the vehicle, the said semaphore being rigidly connected with the post and extending at right angles thereto, a supporting arm attached to the said vehicle and extending laterally therefrom in a plane parallel with that in which the semaphore is adapted to move, the outer extremity of said arm being provided with a part extending at right angles thereto, said part terminating in an upwardly projecting lip, upwardly projecting lips also secured to the said arm intermediate the extremities of the latter, and a knob mounted upon one extremity of the post whereby the latter can be rotated to raise or lower the semaphore, the latter when in the lowered position resting upon the said supporting arm between the first named lip and the second named lips.

3. A vehicle signal comprising a movable semaphore pivotally connected with the vehicle, a supporting arm secured to the vehicle and extending laterally therefrom in a plane parallel to that in which the semaphore moves, a rest on the outer end of said arm to support the free end of the semaphore when in signaling position, said rest comprising a lateral offset on the end of said arm having an upwardly projecting lip, and lips on said arm adjacent its free end, said last named lips constituting electric contacts, contacts on the semaphore to engage therewith when in signaling position, all of said lips constituting means to prevent lateral movement of the semaphore on said arm, and a lamp on the semaphore connected with the contacts on the semaphore.

In testimony whereof I affix my signature, in presence of two witnesses.

JACKSON C. HOYT.

Witnesses:
 CHAS. E. PARSONS,
 HELEN A. VILLEMAGNE.

Copies of this patent may be obtained for five cents each, by addressing the "Commissioner of Patents, Washington, D. C."